(12) United States Patent
Barnes

(10) Patent No.: US 7,341,769 B2
(45) Date of Patent: Mar. 11, 2008

(54) LAMINATED FABRIC FOR AIRBAG

(75) Inventor: John Barnes, Bymock (GB)

(73) Assignee: Invista North America S.A R.L., Wilmington, DE (US)

( * ) Notice: Subject to any disclaimer, the term of this patent is extended or adjusted under 35 U.S.C. 154(b) by 100 days.

(21) Appl. No.: 10/373,461

(22) Filed: Feb. 25, 2003

(65) Prior Publication Data

US 2003/0129339 A1  Jul. 10, 2003

Related U.S. Application Data

(63) Continuation of application No. 09/804,563, filed on Mar. 12, 2001, now abandoned.

(60) Provisional application No. 60/188,778, filed on Mar. 13, 2000.

(51) Int. Cl.
*B29D 22/00* (2006.01)
*B29D 23/00* (2006.01)
*B32B 1/08* (2006.01)

(52) U.S. Cl. ............ 428/35.2; 428/35.4; 428/36.1; 428/373; 428/374; 428/480; 280/728.1; 280/743.2

(58) Field of Classification Search ........... 428/36.1, 428/311.11, 315.17, 318.4, 319.7, 339, 340, 428/423.5, 423.7, 448, 476.1, 475.8, 480, 428/483, 35.2, 35.4, 373, 374; 280/728.1, 280/743.2

See application file for complete search history.

(56) References Cited

U.S. PATENT DOCUMENTS

| 3,264,272 | A | 8/1966 | Rees |
| 4,010,222 | A | 3/1977 | Shih |
| 4,921,735 | A | 5/1990 | Bloch |
| 4,977,016 | A | 12/1990 | Thornton et al. |
| 5,073,418 | A | 12/1991 | Thornton et al. |
| 5,076,975 | A | 12/1991 | Davis |
| 5,110,666 | A | 5/1992 | Menzel et al. |
| 5,763,330 | A | 6/1998 | Bertolucci et al. |
| 5,897,929 | A | 4/1999 | Li et al. |

FOREIGN PATENT DOCUMENTS

| EP | 1044803 | 10/2000 |
| JP | 04 201649 | 7/1992 |
| JP | 05 338092 A | 12/1993 |

OTHER PUBLICATIONS

Derwent Publications Ltd., Japan Patent Abstract, JP 06 305089 A, Tomogawa Seishisho KK., Nov. 1, 1994.
Derwent Publications Ltd., Japan Patent Abstract, JP 03 007337 A, Tomoegawa paper Mfg., Co. Ltd., Jan. 14, 1991.

*Primary Examiner*—Michael C. Miggins

(57) ABSTRACT

A laminated fabric of an elastomeric copolyetherester-based film laminated to a manmade fiber substrate fabric and having a stiffness of from about 5 to 80 Newtons measured according to test method ASTM D4032-94 is described which demonstrates a desirable combination of stiffness and foldability, non-blocking (non self-sticking), air impermeability and resistance to heat aging.

14 Claims, No Drawings

LAMINATED FABRIC FOR AIRBAG

CROSS REFERENCE TO RELATED APPLICATIONS

This application is a continuation of U.S. application Ser. No. 09/804,563, filed Mar. 12, 2001, now abandoned, which claims the benefit of U.S. Provisional Application No. 60/188,778, filed Mar. 13, 2000.

BACKGROUND OF THE INVENTION

1. Field of the Invention

This invention generally relates to laminated fabrics, and more particularly concerns laminated fabrics (laminates) for use in the manufacture of air bags for automobile restraint systems.

2. Description of the Related Art

Polyester and polyamide fabrics having various coatings to reduce permeability are known. U.S. Pat. No. 5,897,929 describes a polyester or polyamide fabric coated with a porosity blocking layer of polyamide material. U.S. Pat. No. 5,110,666 describes a fabric substrate which is coated with a polycarbonate-polyether polyurethane which provides certain permeability, flexibility, toughness and other properties. U.S. Pat. No. 5,076,975 describes a molding operation for forming an elastomer-coated fabric having a defined shape. U.S. Pat. No. 5,763,330 describes a method for extrusion coating a polyethylene resin onto a nylon fabric.

As used herein, "air bag" means inflatable passive safety restraints for automobiles and many other forms of transportation, including military and aviation applications. Air bags are one form of inflatable passive safety restraint device which are now standard in automotive use. Air bags in automobiles must satisfy demanding requirements. Specifically, these requirements include the ability to inflate fully and deflate in milliseconds, or remain partially inflated for several seconds, while fully absorbing passenger impact and providing subsequent pneumatic dampening after impact. The strong and lightweight fabrics used in air bag construction must be relatively airtight, foldable into compact configurations and be resistant to abrasion. Multiple air bag configurations in use include air bags for the front seating area, for side impact protection, for rear seat use, for use in headliner area inflatable curtains, and for use in inflatable seat belts.

The woven fabrics from which air bags are traditionally manufactured may be coated with elastic materials (notably silicone rubber) to manage the air permeability of the fabric. Sticking or blocking of rubber coated fabrics after long term storage in a folded configuration is one of the well known deficiencies of such coated fabrics. Where silicone is applied to the air bag fabric, the application rate of the silicone tends to be quite high, leading to a very flat surface with high friction characteristics which may injure vehicle occupants. As a consequence, such air bag fabric may need to be covered with a non-woven. Alternatives to coatings have been sought over the past few years. Heat shrinking fabrics are one alternative. Calendering the fabric is another alternative. However, these alternatives involve further process steps and more complexity.

EP 1 044 803 A2 discloses a fabric/film laminate for use in air bags. The disclosed laminate films include a polyether block amide, polyurethanes and modified polyolefins. Laminates made with films of polyether block amide are said to be superior to silicone coated fabrics for use in air bag applications in terms of reduced pack volume, reduced wall stiffness and reduced frictional susceptibility. However, there is still a need for fabric/film laminates for use in air bags that provide even lower stiffness so as to be more foldable without at the same time increasing the stickiness of the laminate, which would result in greater undesirable blocking when used in an air bag. There is a further need for fabric/film laminates for use in air bags, which laminates have desirable air permeability characteristics and have a low tendency to wrinkle.

DETAILED DESCRIPTION

The present invention provides an air bag comprised of a laminated fabric that possesses a unique combination of properties ideally suited for air bag manufacture. In particular, the laminate demonstrates a desirable combination of reduced stiffness, increased foldability, and a reduced tendency to edge curl and develop wrinkles, while at the same time exhibiting low blocking (i.e., little or no self-sticking), desired low air impermeability, and good resistance to heat aging. This laminate comprises a copolyetherester-based elastomeric film laminated to a manmade fiber substrate fabric. The laminate has a foldability of from about 5 to 80 Newtons measured according to King stiffness test method ASTM D4032, a high nonblocking tendency, and low natural curvature.

Elastomeric films suitable for the present invention include those made from copolyetheresters and copolyetherester blends. These films and the resins for fabricating them are known and commercially available. Suitable copolyetheresters and copolyetherester blends are available from the E.I. du Pont de Nemours and Company, Wilmington, Del., USA ("DuPont").

Preferred copolyetheresters for fabricating the elastomeric film have a multiplicity of recurring long-chain ester units and short-chain ester units joined head-to-tail through ester linkages. The long-chain ester units are represented by the formula:

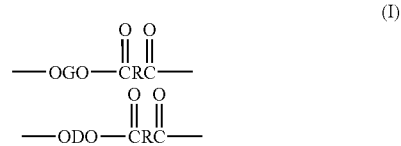

and the short-chain ester units are represented by the formula:

(II)

wherein:
a) G is a divalent radical remaining after the removal of terminal hydroxyl groups from a poly(alkylene oxide) glycol having a number average molecular weight of about 400-4000;
b) R is a divalent radical remaining after removal of carboxyl groups from a dicarboxylic acid having a molecular weight less than 300;
c) D is a divalent radical remaining after removal of hydroxyl groups from a diol having a molecular weight less than about 250;
   wherein the copolyetherester contains about 25-80 weight percent short-chain ester units.

An ethylene-based copolymer additive may also be blended with the preferred copolyetheresters of the elastomeric film. This ethylene-based copolymer additive may be present in an amount of about 0.2 to 20 percent by weight, and more preferably 4 to 12 percent by weight. It has been found that blending certain ethylene-based copolymers with the copolyetherester results in a more stable and less sticky film that is less susceptible to blocking when used in air bag laminate materials. Suitable ethylene-based copolymer additives are copolymers of ethylene and α,β-unsaturated $C_3$-$C_8$ carboxylic acid, and optionally of one or more softening comonomers copolymerizable with the ethylene. The ethylene monomer is preferably present in an amount of at least 60 weight %, relative to the weight of the polymer. The α,β-unsaturated $C_3$-$C_8$ carboxylic acid is preferably present in an amount of 5-15 weight %, relative to the weight of the polymer. Acrylic and methacrylic acids are preferred acid comonomers The ethylene-based copolymer is optionally about 10 to 99.5% neutralized with metal ions selected from groups Ia, Ib, IIa, IIIa, IVa, VIb, and VIII of the Periodic Table of Elements such as sodium, potassium, zinc, calcium, magnesium, lithium, aluminum, nickel, and chromium. Such neutralized ethylene acid copolymers are known in the art as 'ionomers'. Ionomers and their methods of manufacture are described in U.S. Pat. No. 3,264,272. Typically, neutralization will be from 10-70%. Preferably the copolymer has from about 35% to about 70% of the carboxylic acid groups ionized by neutralization with metal ions selected from the group consisting of sodium, potassium, and lithium. Preferred ethylene-based copolymers are disclosed in U.S. Pat. No. 4,010,222 which is hereby incorporated by reference. A preferred ethylene-based copolymer additive is a copolymer containing 89 weight percent of ethylene and 11 weight percent of methacrylic acid where about 75% of the carboxylic acid groups in the copolymer are neutralized by sodium ions.

The softening monomer that may be copolymerized with the ethylene-based copolymer is preferably present in an amount of less than 25 weight %, relative to the weight of the copolymer. The softening comonomer can be an alkyl acrylate selected from the group consisting of methyl acrylate, n-propyl-, iso-butyl-, n-butyl-, n-octyl-, 2-ethylhexyl-, and 2-methoxyethyl-acrylates. The preferred alkyl acrylates are iso-butyl-, n-butyl-, 2-ethylhexyl-, and 2-methoxyethyl-acrylates. The softening comonomer can also be an alkyl vinyl ether selected from the group consisting of n-butyl-, n-hexyl-, 2-ethylhexyl-, and 2-methoxyethyl-vinyl ether. The preferred alkyl vinyl ethers are n-butyl vinyl ether and n-hexyl vinyl ether.

The elastomeric films typically have a thickness ranging from 5 to 50 ☐☐☐ mm). Methods for making these films are well known and include extrusion and casting. They may be made with or without a carrier. The films can be prefabricated or can be extruded directly onto the fabric substrate. Preferably, the film is directly extruded onto the fabric substrate. An elastomeric film may be applied to each side of the fabric substrate.

Any manmade yarn can be used in the substrate fabric, although typically the yarn will be of polyamide or polyester. Polyamide substrate fabrics are preferred. The decitex of the polyamide fiber will typically range from 110 to 940. The fabrics are woven in a manner that yields low air permeability, or may be treated to reduce permeability, such as by calendering. Processes for mechanically treating fabrics are described in U.S. Pat. Nos. 4,921,735, 4,977,016 and 5,073,418. Typically, the air permeability of air bag fabrics is less than 10 liters per square decimeter per minute under a test pressure differential of 500 pascal.

Air bag fabrics are often made from commercially available polyamide yarns such as yarns with a 235 to 940 dtex and with 34 to 210 filaments per yarn. A 470 dtex polyamide yarn used in woven fabrics for air bags is typically woven with 16 to 22 yarns per cm in both warp and weft. A 235 dtex polyamide yarn used in woven fabrics for air bags is typically woven with 27 to 30 yarns per cm to achieve the required air permeability.

Laminated Fabric Preparation Steps:

Fabric Preparation

The fabric is usually woven or knitted and then scoured and dried or heat set prior to lamination. Scouring removes size and spinning finish deposits, though careful choice of suitable adhesives or spinning finishes can render this step unnecessary. If desired, the fabric may be multi-layered and sewn, bonded, welded or woven together to take the form of a closed or semi-closed structure capable of containing gas or other fluids.

Film Preparation

Films are prepared by conventional casting or extrusion processes.

Lamination

The elastomeric film can be directly laminated onto the fabric or an adhesive can be employed to enhance the bond between the elastomeric film and the fabric substrate. Suitable adhesives include polyurethanes, polyetherurethanes, ethylene copolymers and silicones. A suitable polyurethane adhesive is available from Henkel under the tradename Liofol®. A suitable ethylene copolymer adhesive is available from DuPont under the tradename Bynel®. Adhesives are preferably applied at a rate of 5 to 100 $g/m^2$. They may be disposed between the fabric substrate and the elastomeric film by any conventional method. The adhesive may be coextruded onto the fabric substrate together with the elastomeric film. The adhesive may be a heat curing, moisture curing, time curing, solvent-based, or hot melt adhesive, or it may take another known form of adhesive or binder, and it may be single or multi-component. In the case of multi-component adhesives, the components which must be brought together to effect curing may be coated separately onto the film and textile substrate if desired in order to prolong working life.

Lamination may be achieved in a variety of ways. Adhesive may be coated onto the fabric or the film or both using a knife over air or a knife over roller process, or alternatively may be sprayed or printed onto the fabric or applied using any known process. Typically the adhesive will be applied as a continuous film, although it may be discontinuous as long as it has sufficient strength. The temperature of the adhesive during the process should be chosen to generate appropriate viscosity and, if the adhesive is cured, rate of cure.

Following application of the adhesive, the fabric substrate and the elastomeric film are brought together and pressure is applied using a roll or series of rolls, pressure pad, bar or other device, and the resulting laminate is allowed to form into a coherent structure. Any necessary cure process can then be performed.

Where an adhesive is used to enhance the bond between the elastomeric film and the fabric substrate, the film and substrate fabric are typically bonded together to form the laminate at some elevated temperature in order to cure the adhesive. These elevated temperatures may be as high as 180° C. Curing takes place and fixes the elastomeric film and the fabric together at the elevated curing temperature. Upon cooling, the thermal expansion behavior and stiffness characteristics of the film and substrate fabric can cause the laminate to curve and wrinkle, especially when only one side of the fabric is laminated. Such curvature is undesirable because the curvature causes the laminate to wrinkle which makes compact folding and packing of an air bag made of the laminate very difficult. Wrinkles in the laminate also have the disadvantage of reducing bonding between the film and fabric layers of the laminate.

Curvature of the laminate can be minimized by careful choice of the film used with a particular substrate fabric. Laminate curvature can be minimized by selecting a film with a coefficient of thermal expansion that is similar to the coefficient of thermal expansion of the fabric. Minimization of the stiffness of the layers forming the laminate, and the use of a room temperature (or closer to room temperature) adhesive cure process, can also help to reduce curvature of the cured laminate. Given the constraint of using a fabric substrate as the main structural element of an air bag, the tensile modulus and the coefficient of thermal expansion for the fabric are of main concern. For the preferred nylon fabrics, the tensile modulus and the coefficient of thermal expansion are about one GPa at low strain and about $-7.5 \times 10^{-6}$ per ° C. respectively. In view of these properties of nylon fabrics, it has been found that curvature and wrinkling of a laminate can be reduced by selecting a film layer with a low coefficient of thermal expansion and a low tensile modulus (i.e., low stiffness). The copolyetherester-based films used in the laminates of the present invention have a low coefficient of thermal expansion that results in less residual stress after heat curing. In addition, the elastomeric nature of copolyetherester-based films provides a film with a low tensile modulus that is less prone to produce a wrinkled laminate.

In order to demonstrate the relative lack of curvature in the fabric/film laminate made with the copolyetherester film described above, numerical calculations were performed that predict the likely behavior of the laminate. Curvature of laminates can be predicted using classical lamination theory, as described in S. W. Tsai & Hahn,"An Introduction to Composite Materials," Technomic Publishing, 1980. The curvature of the resultant laminate is calculated from the effective thermal moment and thermal stress on the structure given by:

$$M_x = \int Q_{xy} e_y z \, dz \text{ and } N_x = \int Q_{xy} e_y dz$$

Where M denotes the effective thermal moment, N the thermal stress, the subscripts x and y the principal material property axes in the plane of the laminate and z the thickness. The terms $Q_{xy}$ are defined by the mechanical property matrix:

$$\begin{array}{c|ccc} & \varepsilon_x & \varepsilon_y & \varepsilon_s \\ \hline \sigma_x & Q_{xx} & Q_{xy} & \\ \sigma_y = & Q_{yx} & Q_{yy} & \\ \sigma_s & & & Q_s \end{array}$$

And $e_y$ is the micro mechanical linear strain given by
$$e_y = \alpha_y \Delta T$$
Where $\alpha$ is the coefficient of thermal expansion of each layer and $\Delta T$ is the temperature difference between cure and ambient.

Predicted curvature was calculated for three hypothetical laminates comprised of a fabric laminated on one side with a film. In each instance, the fabric was the nylon 66 fabric designated as Fabric B in the examples described below and the film had a thickness of 50 micrometer (0.050 mm). In Case A, Fabric B was laminated with a film of the copolyetherester blend of Example 1a according to the process of Example 1a. In Case B, Fabric B was laminated with a Dartek®) polyamide film according to the process of Example 1 b. In Case C, Fabric B was laminated with a film Mylar® polyester film according to the process of Example 1 c. The calculated radii of curvature were as follows:

| Case A | Copolyetherester Blend | 13.7 meters |
| Case B | Dartek ® polyamide | 12.1 cm |
| Case C | Mylar ® polyester | 5.2 cm |

The laminate made from the copolyetherester blend film is far superior to the other two laminates because the laminate with the copolyetherester blend film should have little overall curvature compared with the other two laminates.

The laminated fabric of the air bag of the invention exhibits the following characteristics: appropriate strength, extension at break, energy absorption capability, tear strength, scrub resistance, adhesion, packability and flexibility for air bags. The laminated fabric in the air bag of the invention does not stick to itself (block) and it exhibits an air permeability of less than 1 liter per square decimeter per minute under a test pressure differential of 500 pascal, and even less than 0.1 liter per square decimeter per minute under a test pressure differential of 500 pascal. Moreover, the laminated fabric in the air bag of the invention continues to display these characteristics after both heat aging (typically after 14 days at 105 to 125° C.) and combined heat and humidity cycling usually over a range including, but not limited to, excursions to 105° C. −40° C. and 85° C. at 95% RH.

Test Methods

Stiffness of laminate materials was measured according to ASTM D4032-94, with fabric stiffness measurements reported in units of Newtons. This test method is also know as the King Stiffness Test.

Blocking (self sticking) was tested according to ISO 5978:1990(E) (equivalent to DIN EN 25978) method with following modifications: 100 mm by 100 mm laminate samples were cut. Four specimen samples were prepared and placed under a weight, and aluminum divider plates separated each specimen from one another. The weight applied a pressure of about 0.2 Newton per cm² to all specimens. Each was conditioned for 168 hours at 105° C. and then tested with a hanging weight of 50 grams for 60 seconds. The time for separation of a specimen from itself was recorded. Immediate separation of each specimen from itself was rated as a pass. Separation times greater than 60 seconds were rated as "blocked".

Curvature of laminate structures can be determined by direct measurement. Coated laminate fabrics tend to roll into a tube when left to themselves on a flat surface, especially where the fabric is coated on just one side. The diameter of such a tube is a rating of the natural curvature the laminate tends to assume. The width of the laminate is measured and the height of the edges above the plane surface are measured. From this measurement a tube diameter or radius of curvature may be determined (the radius curvature is onehalf of the measured diameter). A larger radius of curvature is indicative of less curvature.

EXAMPLES

The following fabrics were used in producing the laminates of the examples:

Fabric A was prepared from nylon 66 continuous filament light denier industrial yarn of 350 decitex total yarn fineness, called Type 769 and available from DuPont. The yarn was woven in a symmetrical weave, scoured and not heat set. The weaving intensity was 57 warp yarns per inch and 57 weft yarns per inch (equivalent to 22/cm by 22/cm).

Fabric B was prepared in the same manner as Fabric A, except that the yarn was a Type 749 continuous filament nylon 66 yarn, also from DuPont, with 470 decitex total yarn fineness. Fabric B was woven and scoured like Fabric A and had a weaving intensity of 49 warps per inch by 49 wefts per inch (19/cm by 19/cm).

Fabric C was prepared from a light denier industrial polyester yarn, Type 68 DACRON® from DuPont, having a total decitex of 480. This polyester yarn was based on polyethylene terephthalate homopolymer. Fabric C was woven and scoured like Fabric A and had a weaving intensity of 49 warps per inch by 49 wefts per inch (19/cm by 19/cm).

Example 1

In Example 1a, Fabric A was laminated with a film prepared by mixing three polymers and a stabilizer in a twin screw continuous mixer extruder. The ingredients were as follows in weight %:

63% of a copolyetherester elastomer containing 60 weight percent of 1,4 butylene terephthalate and 40 weight percent of poly(tetramethylene ether) glycol terephthalate. The molecular weight of the poly(tetramethylene ether) glycol was 975;

30% of a copolyetherester elastomer containing 39 weight percent of 1,4 butylene terephthalate, 11 weight percent of 1,4 butylene isophthalate, 39 weight percent of poly(tetramethylene ether) glycol terephthalate, and 11 weight percent of poly(tetramethylene ether) glycol isophthalate. The molecular weight of the poly(tetramethylene ether) glycol was 975;

6% by weight of an ethylene-based copolymer additive containing 89 weight percent of ethylene and 11 weight percent of methacrylic acid where about 75% of the carboxylic acid groups in the copolymer are neutralized by sodium ions; and 1% of 4,4'-bis($\alpha,\alpha$-dimethyl)diphenylamine.

The film was prepared by a conventional extrusion process. The film had a thickness of 0.8 mil (0.020 mm). The fabric was about 20 cm wide and the film was also about 20 cm wide. Handmade samples were prepared by bonding the film to the fabric substrate using a spray urethane adhesive applied to the fabric at a basis weight of less than 30 g/m$^2$. The fabric with the adhesive and the film were pressed together with enough force to form a coherent laminate.

In Example 1b, Fabric A was laminated with a film of DARTEK® 101; a thermoformable cast film of nylon 66 from DuPont, 0.8 mil (0.020 mm) in thickness. The fabric was about 20 cm wide and the film was also about 20 cm wide. Handmade samples were prepared by bonding the film to the fabric substrate using a spray urethane adhesive applied to the fabric at a basis weight of less than 30 g/m$^2$. The fabric with the adhesive and the film were pressed together with enough force to form a coherent laminate.

In Example 1 c, Fabric A was laminated with a lamination film of MYLAR® polyester, 0.75 mil (0.019 mm) in thickness from DuPont. The fabric was about 20 cm wide and the film was also about 20 cm wide. Handmade samples were prepared by bonding the film to the fabric substrate using a spray urethane adhesive applied to the fabric at a basis weight of less than 30 g/m$^2$. The fabric with the adhesive and the film were pressed together with enough force to form a coherent laminate.

Example 2

In Example 2a, Fabric B was laminated with the film of Example 1a according to the process of Example 1a.

In Example 2b, Fabric B was laminated with the film of Example 1 b according to the process of Example 1 b.

In Example 2c, Fabric B was laminated with the film of Example 1c according to the process of Example 1c.

Example 3

In Example 3a, Fabric C was laminated with the film of Example 1a according to the process of Example 1a.

In Example 3b, Fabric C was laminated with the film of Example 1b according to the process of Example 1b.

In Example 3c, Fabric C was laminated with the film of Example 1 c according to the process of Example 1 c.

The stiffness of all of the fabrics of Examples 1, 2 and 3 and the unlaminated Fabrics A, B and C were measured according to ASTM D4032-94, and are reported in Table 1. These data show that all unlaminated control Fabrics A, B and C are less stiff than any corresponding laminated fabrics of Examples 1, 2, and 3. This result is expected. Control Fabric C, the 480 dtex polyester fabric, was the stiffest of the controls and contributed to making the most stiff laminates. The laminates made with nylon 66 with a film of blended copolyetheresters (Examples 1a and 1b) were significantly less stiff than the other laminates, including the nylon fabrics laminated with the polyamide film (Examples 2a and 2b) and the nylon fabrics laminated to the polyester film (Examples 3a and 3b). Reduced fabric stiffness contributes to a superior ease of fabric folding such that when the laminate is used in air bag modules, smaller package volume can be achieved. The air permeability of the laminates of examples 1a, 2a, and 3a was measured and in each case was 0 liter per square decimeter per minute under a test pressure differential of 500 pascal.

TABLE 1

| Example | Substrate fabric | Gas barrier lamination film | Stiffness (Newtons) ave. of 5 measurements |
| --- | --- | --- | --- |
| Control A | Fabric A | None | 4.43 |
| Control B | Fabric B | none | 5.83 |
| Control C | Fabric C | none | 13.50 |
| Example 1a. | Fabric A | polyetherester blend film | 7.88 |
| Example 1b. | Fabric B | " | 14.61 |
| Example 1c. | Fabric C | " | 19.22 |
| Example 2a. | Fabric A | DARTEK 101 film | 10.57 |
| Example 2b. | Fabric B | " | 19.69 |
| Example 2c. | Fabric C | " | 21.27 |
| Example 3a. | Fabric A | MYLAR film | 14.43 |
| Example 3b. | Fabric B | " | 21.24 |
| Example 3c. | Fabric C | " | 23.82 |

Example 4

In this example, fabric/film laminates of nylon fabrics laminated with films of the copolyetherester blend of Example 1 were tested for blocking.

In Example 4a, the fabric was a nylon 66 continuous filament light denier industrial yarn of 470 decitex total yarn fineness, called Type 749 and available from DuPont. The yarn was woven in a symmetrical weave, scoured and not heat set. The weaving intensity was 51 warp yarns per inch and 52 weft yarns per inch (equivalent to 20.1/cm by 20.5/cm). The fabric was laminated with a film made from the stabilized copolyetherester blend of Example 1a. The film had a thickness of 0.8 mil (0.020 mm).

In Example 4b, the nylon 66 fabric of Example 4a was laminated with a film made from the stabilized copolyetherester blend of Example 1a. The film had a thickness of 0.6-0.65 mil (0.015-0.016 mm).

Two specimens of the laminate of Example 4a and two specimens of the laminate of Example 4b were tested for blocking according to ISO 5978:1990(E) (DIN EN 25978) with the modifications described above. The results are summarized in Table 2. The data in Table 2 show that flexible film laminates of the invention, like the laminates of Examples 1a and 1b, do not block, i.e. they do not stick to themselves. This is quit surprising because flexibility in films is usually due to flexibilized elements in the polymer which tend to migrate to the surface where they cause adhesion.

TABLE 2

| | Example | |
|---|---|---|
| | 4a* | 4b* |
| | Laminated with an air permeability barrier film of 0.020 mm thickness Based on copolyetheresters | Laminated with an air permeability barrier film of 0.015-0.016 mm thickness based on copolyetheresters |
| Result—Specimen 1 | Did not Block | Did not Block |
| Result—Specimen 2 | Did not Block | Did not Block |

*ISO 5978 (DIN EN 25978) method the samples were conditioned for 168 hours @ 105° C. and tested with a 50 gram hanging weight for 60 seconds.

The invention claimed is:

1. An air bag comprised of a laminated fabric, said laminated fabric comprising an elastomeric film which has been prepared by a casting or extrusion process and which is laminated to manmade fiber substrate fabric, wherein the elastomeric film is comprised of at least 70% by weight of a copolyetherester (A) having a multiplicity of recurring long-chain ester units and short-chain ester units joined head-to-tail through ester linkages, said long-chain ester units being represented by the formula:

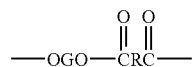

and said short-chain ester units being represented by the formula:

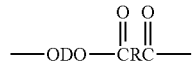

wherein:
a) G is a divalent radical remaining after the removal of terminal hydroxyl groups from a poly(alkylene oxide)glycol having a number average molecular weight of about 400-4000;
b) R is a divalent radical remaining after removal of carboxyl groups from a dicarboxylic acid having a molecular weight less than 300;
c) D is a divalent radical remaining after removal of hydroxyl groups from a diol having a molecular weight less than about 250;

wherein the copolyetherester contains about 25-80 weight percent short-chain ester units, and wherein the laminated fabric has a stiffness of from about 5 to 80 Newtons measured according to test method ASTM D4032-94.

2. The air bag of claim 1, wherein the elastomeric film is comprised of at least 90% by weight of the copolyetherester (A).

3. The air bag of claim 1 wherein the laminated fabric does not block.

4. The air bag of claim 1 wherein the laminated fabric has an air permeability of less than 1 liter per square decimeter per minute under a test pressure differential of 500 pascal.

5. The air bag of claim 1 wherein the elastomeric film has been extruded directly onto the manmade fiber substrate fabric.

6. The air bag of claim 1, wherein the elastomeric film contains about 0.2-20 weight percent of an ethylene-based copolymer additive.

7. The air bag of claim 6, wherein the elastomeric film contains about 4-12 weight percent of an ethylene-based copolymer additive.

8. The air bag of claim 6 wherein said ethylene-based copolymer additive comprises at least 60 weight percent of ethylene monomer, and about 5 to about 15 weight percent of an alpha,beta-unsaturated C3-C8 carboxylic acid monomer, where about 10 to 99.5% of the carboxylic acid groups in the copolymer are neutralized with metal ions selected from the group of sodium, potassium, zinc, calcium, magnesium, lithium, aluminum, nickel, and chromium.

9. The air bag of claim 8 wherein about 10 to 99.5% of the carboxylic acid groups in the copolymer are neutralized with metal ions selected from the group of sodium, potassium, and lithium.

10. The air bag of claim 8 wherein the ethylene-based copolymer additive includes one or more softening comonomers copolymerizable with the ethylene comonomer, said softening comonomer being present in an amount of less than 25 weight percent relative to the weight of the ethylene-based copolymer.

11. The air bag of claim 1 wherein the manmade fiber substrate fabric is comprised of at least 85% by weight of nylon polymer.

12. The air bag of claim 11 wherein the substrate fabric comprises polyamide yarn with a decitex range from 110 to 940.

13. The air bag of claim 1 further comprising an adhesive for laminating the elastomeric film to the fabric.

14. The air bag of claim 13 wherein the adhesive is from the group of polyurethane, polyetherurethane, ethylene copolymers, and silicones.

* * * * *